United States Patent Office 3,105,067
Patented Sept. 24, 1963

3,105,067
PROCESS FOR PREPARING L-α-AMINOLACTAM FROM A MIXTURE OF D- AND L-α-AMINO-LACTAM
Johannes E. Nelemans, Geleen, Albertus H. Pecasse, Maastricht, and Willem Pesch and Ulrich Verstrijden, Geleen, Netherlands, assignors to Stamicarbon N.V., Heerlen, Netherlands
No Drawing. Filed July 13, 1960, Ser. No. 42,512
Claims priority, application Netherlands July 15, 1959
15 Claims. (Cl. 260—239.3)

This invention relates to the preparation of L-α-aminolactam by precipitating from a mixture of D- and L-α-aminolactam one of the optical antipodes in a liquid medium as the salt of the optically active pyrrolidone carboxylic acid with the same steric configuration, separating the precipitate from the liquid to obtain a phase rich in L-α-aminolactam and a phase rich in D-α-aminolactam and subsequently recovering the L-α-aminolactam from the former.

By "a compound of the same steric configuration" is meant here a compound that can be derived from the same optical isomer of glycer-aldehyde in the way described by Cahn and Ingold in J. Chem. Soc., pp. 612–622 (1951).

Furthermore, the salts of an L-α-aminolactam with L- and D-Pyrrolidone carboxylic acid are called "L,L-salt" and "L,D-salt" respectively, and those of a D-α-aminolactam with L- and D-pyrrolidone carboxylic acid "D,L-salt" and "D,D-salt" respectively.

From Helv. Chim. Acta, XLI (1958), pp. 181–188, it is known that L-α-amino ε-caprolactam can be prepared by adding together equimolar quantities of D,L-α-amino ε-caprolactam and L-pyrrolidone carboxylic acid, dissolved in methanol, separating the precipitate consisting of the salt of L-α-amino ε-caprolactam and L-pyrrolidone carboxylic acid from the mother liquor and decomposing it into L-α-amino ε-caprolactam and L-pyrrolidone carboxylic acid. The L-pyrrolidone carboxylic acid left in the mother liquor is precipitated as barium salt by means of barium methylate. This salt is filtered off and converted into L-pyrrolidone carboxylic acid.

The filtrate, which contains the D-α-amino ε-caprolactam is evaporated in vacuo and the residue is racemized by heating it with sodium.

By distillation in vacuo at 180-190° C. the racemic mixture can then be recoverd with a yield of 70%. After addition of an amount of fresh D,L-α-amino ε-caprolactam, it is again subject to the treatments mentioned above. By repeating this process it is possible eventually to convert 70% of the original amount of D,L-α-amino-ε-caprolactam into the L-form.

In this process use is made of an amount of L-pyrrolidone carboxylic acid which is equivalent to the total amount of α-amino ε-caprolactam, so that after removal of the salt there remains a mother liquor in which the D-α-amino ε-caprolactam and the non-precipitated L-α-amino ε-caprolactam, both being bound to an equivalent amount of L-pyrrolidone carboxylic acid, are dissolved. This involves the disadvantage that the L-pyrrolidone carboxylic acid has to be separated from the α-amino ε-caprolactam before the latter can be racemized. Moreover, this separation is rather expensive as in this operation use is made of barium methylate. Finally, the L-pyrrolidone carboxylic acid has to be recovered from the barium salt to enable it to be reused.

The method of racemization, in which 30% of the α-amino ε-caprolactam gets lost, is another disadvantage of the process.

There has now been found a process by which the abovementioned disadvantages can be obviated.

The process according to the invention for preparing L-α-aminolactam by precipitating from a mixture of D- and L-α-aminolactam one of the optical antipodes in a liquid medium as the salt of the optically active pyrrolidone carboxylic acid with the same steric configuration, separating the precipitate from the liquid to obtain a phase rich in L-α-aminolactam and a phase rich in D-α-aminolactam and subsequently recovering the L-α-aminolactam from the former phase, is characterized in that an amount of pyrrolidone carboxylic acid is used which is smaller than the amount equivalent to the total amount of α-aminolactam and a liquid medium is applied in which the salts of D-and L-α-aminolactam with the optically active pyrrolidone carboxylic acid are both substantially insoluble.

The customary method for resolving D,L-mixtures by reaction with an optically active compound is based on the use of a combination of an optically active compound and a liquid in which the disastereo-isomers formed differ sufficiently is solubility to enable them to be separated by fractional crystallization. This principle is used in the known process described above. In the process according to the invention, however, the crystallization is carried out in a medium in which the diastereo-isomers are both insoluble. It might be expected that the precipitate forming in such a medium would consist of a mixture of the two diastereo-isomers in a ratio not considerably different from that between D- and L-α-aminolactam in the mixture to be resolved.

Surprisingly, it has been found, however, that an amount of pyrrolidone carboxylic acid which is smaller or duly slightly larger than the amount equivalent to the amount of the optically active α-aminolactam with the same steric configuration, gives a precipitate for the larger part of which consists of the salt of these two compounds. The optically active compound to be used may be optically active pyrrolidone carboxylic acid or its ammonium salt, or a mixture of these compounds.

The liquid medium to be used in the process according to the invention may be any liquid in which the salts of the α-aminolactam with the optically active pyrrolidone carboxylic acid are substantially insoluble, whereas the α-aminolactam itself does dissolve in it. Such liquids are for example dioxane and hydrocarbons, such as gasoline, kerosene, hexane, heptane, benzene, toluene, xylene, mesitylene, cyclohexane and alkylcyclohexane.

According to a method of realizing the process of the invention the mixture of D- and L-α-aminolactam is brought together in the liquid medium with L-pyrrolidone carboxylic acid or L-ammoniumpyrrolidonate, as a result of which the L,L salt precipitates. To effect the best possible separation between the D- and L-α-aminolactam, it is advisable to use not more than 1 mole, and preferably 0.9–1 mole of L-pyrrolidone carboxylic acid or L-ammonium pyrrolidonate per mole of L-α-aminolactam.

The mixture of D- and L-α-aminolactam may be brought together with the pyrrolidone carboxylic acid in the liquid medium in various ways. For example, the acid may be suspended in a solution of D- and L-α-aminolactam in the said medium, or a solution of the acid in a polar solvent, such as alcohol or water, may be added to a solution of D- and L-α-aminolactam in the liquid medium.

According to another method of realizing the process of the invention one of the two reagents is dissolved in a polar solvent after which the solution thus obtained is added gradually to the liquid medium, in which the other reagent has been distributed, and the polar solvent is simultaneously expelled from the medium.

According to another method of realizing the process of the invention one of the two reagents is dissolved in a polar solvent after which the solution thus obtained is added gradually to the liquid medium, in which the other reagent has been distributed, and the polar solvent is simultaneously expelled from the medium.

It is preferred, however, the dissolve the two reagents in the same polar solvent, add this solution to the liquid medium and remove the polar solvent from the said liquid medium by distillation.

It is advantageous to add the solution in the polar solvent gradually and to remove the polar solvent at the same rate as that at which it is supplied.

The polar solvent used is preferably a liquid which is immiscible with the liquid medium. These liquids can be easily separated from each other in the distillate to be re-used.

The L,L-salt can be made free of D,L salt contained therein by heating it for some time with an amount of L-α-aminolactam which is at least equal to the amount of D-α-aminolactam bound in the D,L-salt. Heating may be done in the medium used, in which the required amount of L-α-aminolactam is present in solution.

Under these conditions the equilibrium: D,L salt+L-α-aminolactam⇌L,L-salt+D-α-aminolactam proves to shift towards the right.

When not more than 1 mole L-pyrrolidone carboxylic acid or L-ammonium pyrrolidonate has been used per mole of L-α-aminolactam, this purification can be carried out by simply heating the salt in the medium in which it has been formed since this medium then still contains the required L-α-aminolactam. Preferably, however, the L,L-salt is separated from the liquid and dissolved in a polar solvent, after which the resulting solution, in the presence of an amount of L-α-aminolactam which is at least equivalent to the amount of D-α-aminolactam bound in the D,L salt, is brought together with a fresh amount of the liquid medium and the L,L salt is precipitated again by expelling the polar solvent.

Another very suitable method of purification comprises extracting the L,L salt with an alcohol in which the D,L salt is better soluble than the L,L salt. Such alcohols are for example, methanol, ethanol, isopropanol and butanol.

If desired, the L,L salt may, prior to being freed of the D,L salt, be boiled for some time in a fresh amount of the liquid medium in order to remove occluded free α-aminolactam, if any.

The mother liquor left after the L,L salt has been separated from the mixture of D, and L-α-aminolactam, is inert towards sodium. In consequence, the D-α-aminolactam present therein can be racemized in a simple way by heating the solution together with sodium. Preferably, however, the racemization is carried out by heating the solution in the presence of a small amount of dry sodium hydroxide. From the L,L salt, the L-α-aminolactam and L-pyrrolidone carboxylic acid are recovered. According to a very suitable method an aqueous solution of the L,L salt is led over a cation exchanger, preferably over a cation exchanger in the ammonium form. The α-aminolactam is then adsorbed by the ion exchanger, whereas the pyrrolidone carboxylic acid flows off as an aqueous solution of ammonium pyrrolidonate. From this solution the pyrrolidone carboxylic acid can be isolated in a simple way, after which it can be re-used for a following resolution. The solution as such, after partial evaporation if so desired, may also be used for this purpose. The L-α-aminolactam adsorbed by the ion exchanger is eluted, preferably with aqueous ammonia. This has the advantage that after the ammonium has been evaporated from the effluent, there remains a solution of the free L-α-aminolactam, while moreover the ion exchanger has been converted to its original condition, it is preferred to use sulphonated copolymers of divinylbenzene and styrene as cation exchanger. Other customary cation exchangers may also be used, however.

The advantages of the process according to the invention are evident. In the first place, the number of operations is smaller and the consumption of chemicals is lower because after removal of the L,L-salt from the liquid medium there remains a solution which is free of pyrrolidone carboxylic acid, so that D-α-aminolactam need not be separated from this compound before racemizing it. Secondly, the racemization can be carried out in a much simpler way and with a much higher yield.

According to another way of realizing the process of the invention the mixture of D- and L-α-aminolactam is brought together in the liquid medium with D-pyrrolidone carboxylic acid or D-ammoniumpyrrolidonate with the result that the D,D-salt precipitates. The latter is decomposed into D-pyrrolidone carboxylic acid, which is re-used, and D-α-aminolactam, which is racemized. The L-α-aminolactam can be recovered from the mother liquor, for example by evaporation.

To separate the D- and L-α-aminolactam as completely as possible it is recommendable to use not less than 1 mole D-pyrrolidone carboxylic acid or D-ammonium-pyrrolidonate per mole of D-α-aminolactam. Preferably a slight excess, of up to 0.1 mole is used.

The process according to the invention is particularly suited for preparing L-α-amino ε-caprolactam.

This is preferably done by dissolving the mixture of L- and D-α-amino ε-caprolactam together with L-pyrrolidone carboxylic acid or L-ammonium pyrrolidonate in water and gradually adding the resulting solution onto boiling toluene. The L,L-salt precipitates while the water distills off azeotropically.

The L-α-amino ε-caprolactam is preferably prepared by a cyclic process in which an aqueous solution of D,L-α-amino ε-caprolactam and L-ammonium pyrrolidonate containing 0.9–1 mole of ammonium pyrrolidonate per mole of L-α-amino ε-caprolactam, is introduced into toluene and the water is evaporated. The precipitate formed is separated off and reprecipitated by dissolving it in water and introducing the solution into toluene with addition of an amount of L-α-amino ε-caprolactam which is at least equal to the amount of D-α-amino ε-caprolactam present in the precipitate, and evaporating the water. The precipitate is again isolated and dissolved in water, after which the resulting solution is passed over a cation exchanger previously treated with an aqueous solution of ammonia. The L-ammonium pyrrolidonate solution leaving the ion exchanger, after being partially evaporated if necessary, is recycled to be reacted again with D,L-α-amino ε-caprolactam. The L-α-amino ε-caprolactam adsorbed on the ion exchanger is eluted with an aqueous solution of ammonia, as a result of which the ion exchanger is regenerated and an aqueous solution of L-α-amino ε-caprolactam is obtained, a portion of which, after being partially evaporated if necessary, is added during the abovementioned re-precipitation of the precipitate. The toluene left after the precipitate has been isolated from it, is boiled with dry sodium hydroxide, so as to racemize the D-α-amino ε-caprolactam contained therein. After that the sodium hydroxide is removed and the solution extracted with water, as a result of which an aqueous solution of D,L-α-amino ε-caprolactam is obtained, which is recycled.

The invention is of particular importance for the preparation of L-α-amino ε-caprolactam, but may also be applied for preparing L-α-amino lactams with a larger or smaller number of carbon atoms in the ring, such as, say L-α-amino-oenantholactam and L-α-aminovalerolactam. The invention is not restricted to the preparation of L-α-aminolactam but also relates to the analogous preparation of D-α-aminolactam.

*Example 1*

218.3 g. (1.7 moles) of D,L-α-amino ε-caprolactam together with 99.1 g. (0.77 mole) L-pyrrolidone carboxylic acid are dissolved in 300 g. of water. This solution is pumped into 3 liters of boiling toluene in a period of 1 hour at such a rate that the amounts of water distilled off and added per unit time are equal. After that heating is continued for another 0.5 hour. Subsequently the hot reaction mixture is filtered and the precipitate is sucked dry as thoroughly as possible.

The precipitate is transferred into 1.5 liters of fresh toluene in which it is boiled for 0.5 hour. Then it is filtered off and dried. In this way 196.9 g. of salt are obtained (yield: 99.4% calculated to the amount of pyrrolidone carboxylic acid used) 93% of which consists of L,L salt.

This salt is dissolved in 300 g. of water to which 10.1 g. L-α-amino ε-caprolactam are added. This solution is pumped into 3 liters of boiling toluene in a period of 1 hour and the precipitate formed is heated for another 0.5 hour in boiling toluene, filtered off and boiled again in toluene, filtered off and dried, the process being carried out in the way described above. This gives 196.1 g. of salt, 98.8% of which consists of L,L salt.

*Example 2*

The toluene fractions obtained by the process described in Example 1 are freed of the salt, added together and evaporated until the volume is about 3 liters; this gives a solution of appr. 5% by weight of α-amino ε-caprolactam, which contains predominantly the D-form. 0.6 g. (0.5% by weight calculated to the amount of aminolactam) of dry sodium hydroxide is added to this solution and the mixture thus obtained is boiled for 0.5 hour.

Then, the reaction mixture is cooled to 90° C. in 0.5 hour and filtered to remove the sodium hydroxide from it. The aminolactam proves to be completely racemized, while no losses of α-amino ε-caprolactam have been observed.

*Example 3*

The salt prepared in accordance with the procedure of Example 1 was dissolved in 600 g. of water as a result of which a salt solution of appr. 25% by weight was obtained. At a temperature of 55° C. this solution was passed at a space velocity=1 over a "Dowex 50" cation exchanger in the ammonium form, which subsequently was washed with water until no pyrrolidone carboxylic acid could be indicated anymore in the washing water. Then, the ion exchanger was extracted with 500 ml. of a 5% aqueous ammonia solution at 55° C. and washed with water. The resulting solution contained an amount of α-amino ε-caprolactam which was equivalent to the amount contained in the salt. 98.8% of the product consisted of the L-form.

We claim:

1. In a process for preparing L-α-aminolactam from a mixture of D- and L-α-aminolactam by precipitating, in a liquid medium, an optical antipode of α-aminolactam as the salt of an optically active pyrrolidone carboxylic acid with the same steric configuration, the improvement which consists essentially of the steps of forming a polar solvent solution of a mixture of D- and L-α-aminolactam and an optically active compound selected from the group consisting of pyrrolidone carboxylic acid and ammonium pyrrolidonate wherein less than one mole of said optically active compound is used per mole of said α-aminolactam mixture, and adding said polar solvent solution to a liquid medium in which the salts of D- and L-α-aminolactam with said optically active compound are both substantially insoluble, and in the absence of inorganic bases thereby forming a precipitate consisting for the larger part of the salt of said optically active compound with said α-aminolactam with the same steric configuration.

2. Process according to claim 1, characterized in that the liquid medium used is a hydrocarbon.

3. Process according to claim 1, characterized in that the mixture of D- and L-α-aminolactam is brought together in the liquid medium with a compound selected from the group consisting of L-pyrrolidone carboxylic acid and L-ammonium pyrrolidonate, the salt thus formed is separated from the liquid and the L-α-aminolactam is recovered from the said salt.

4. Process according to claim 3, characterized in that not more than 1 mole of the compound selected from the group consisting of L-pyrrolidone carboxylic acid and L-ammonium pyrrolidonate is used per mole of L-α-aminolactam.

5. Process according to claim 4, characterized in that 0.9–1 mole of the compound selected from the group consisting of L-pyrrolidone carboxylic acid and L-ammonium pyrrolidonate is used per mole of L-α-aminolactam.

6. Process according to claim 1, characterized in that a solution of the compound selected from the group consisting of L-pyrrolidone carboxylic acid and L-ammonium pyrrolidonate and of the mixture of D- and L-α-aminolactam in a polar solvent is added to the liquid medium and the polar solvent is at the same time expelled from the said medium.

7. Process according to claim 6, characterized in that a solution of the compound selected from the group consisting of L-pyrrolidone carboxylic acid and L-ammonium pyrrolidonate and a mixture of D- and L-α-amino ε-caprolactam in water is added to a boiling solution of toluene and the water is at the same time azeotropically distilled off.

8. Process according to claim 6, characterized in that the solution in the polar solvent is added at the same rate, as that at which the polar solvent is expelled by distillation.

9. Process according to claim 1, characterized in that the L,L-salt is separated from the liquid medium and dissolved in a polar solvent, while the resulting solution, in the presence of an amount of L-α-aminolactam which is at least equivalent to the amount of D-α-aminolactam present in the salt, is brought together with a fresh amount of the liquid medium and the L,L salt is precipitated by expelling the polar solvent.

10. Process according to claim 1, characterized in that the L,L salt is extracted with a compound selected from the group consisting of methanol, ethanol, isopropanol or butanol.

11. Process according to claim 1, characterized in that, an aqueous solution of the L,L salt is passed over a cation exchanger in the ammonium form, after which the said ion exchanger is treated with an aqueous ammonia solution.

12. Process according to claim 1, characterized in that the mixture of D- and L-α-aminolactam is brought together with a compound selected from the group consisting of D-pyrrolidone carboxylic acid and D-ammoniumpyrrolidonate in the liquid medium, the salt thus formed is separated from the liquid and the D-α-aminolactam is recovered from the said salt and subsequently racemized to form a mixture which is used again as starting mixture, and that the L-α-aminolactam is recovered from the liquid phase.

13. Process according to claim 12, characterized in that at least 1 mole of the compound selected from the group consisting of D-pyrrolidone carboxylic acid and D-ammonium pyrrolidonate is used per mole of D-α-aminolactam.

14. Process according to claim 13, characterized in that 1.1–1 mole of the compound selected from the group consisting of D-pyrrolidone carboxylic acid and D-ammonium pyrrolidonate is used per mole of D-α-aminolactam.

15. Process according to claim 1, characterized in that the D-α-aminolactam obtained from the product rich in D-α-aminolactam is racemized by heating it together with dry sodium hydroxide in the liquid medium.

References Cited in the file of this patent
UNITED STATES PATENTS

| | | |
|---|---|---|
| 2,528,267 | Dearborn et al. | Oct. 31, 1950 |
| 2,859,244 | White | Nov. 4, 1958 |
| 3,024,231 | Scherrer | Mar. 6, 1962 |

OTHER REFERENCES

Gilman: "Organic Chemistry," vol. 1, pages 189–93, (Wiley) (1938).

Bernthsen and Sudborough: "Organic Chemistry," 2nd Edition, pages 871–7, (Blackie), (1941).

Fieser and Fieser: "Organic Chemistry," 3rd Edition, page 274, Reinhold (1956).

Brenner et al.: Helv. Chim. Acta, vol. 41, pages 181–8, (1958).